United States Patent [19]

White

[11] Patent Number: 4,723,158
[45] Date of Patent: Feb. 2, 1988

[54] METHOD AND APPARATUS FOR PERFORMING SCAN LINE DIAGNOSTIC TESTING IN A VIDEO MONITOR DURING A LAST-LINE OVERSCAN OF A NORMAL DISPLAY RASTER

[75] Inventor: Michael G. White, Deerfield, Ill.

[73] Assignee: Zenith Electronics Corporation, Glenview, Ill.

[21] Appl. No.: 863,223

[22] Filed: May 14, 1986

[51] Int. Cl.[4] .................. H04N 9/73; H04N 5/68; H04N 9/16; H04N 9/20
[52] U.S. Cl. ........................ 358/29; 358/64; 358/65; 358/242; 315/383
[58] Field of Search .............. 358/65, 29, 34, 64, 358/74, 171, 172, 173, 242, 243; 315/383

[56] References Cited

U.S. PATENT DOCUMENTS

| | | | |
|---|---|---|---|
| 3,674,931 | 7/1972 | Fazio et al. | 358/172 |
| 4,160,995 | 7/1979 | Jensen | 358/65 |
| 4,200,882 | 4/1980 | Janssen | 358/65 |
| 4,263,622 | 4/1981 | Hinn | 358/65 |
| 4,340,904 | 7/1982 | Wingrove, Jr. | 358/29 |
| 4,342,048 | 7/1982 | Falater et al. | 358/242 |
| 4,370,674 | 1/1983 | Johnson et al. | 358/74 |
| 4,633,321 | 12/1986 | Tallant, II | 358/74 |

FOREIGN PATENT DOCUMENTS 44227 3/1980 Japan ..................... 358/29

Primary Examiner—James J. Groody
Assistant Examiner—Randall S. Svihla

[57] ABSTRACT

A disclosed last-line overscan system and method allow for sampling of video display characteristics such as RGB cathode currents during each frame of displayed video for an underscanned video monitor without distortion of the visual display. Detection of the initiation of the vertical sync signal operates to overscan the last display line by driving the trace off the visual display area and away from the active raster. Sampling may then occur during an interval in which no visual display is possible thereby preventing distortion of visual information and preventing undesired brightness in the active raster. Subsequent to the interval for sampling of the RGB beam currents, vertical retrace is effectuated for display of the succeeding video frame. The video trace of the raster is bumped from the video display area and beyond the normal viewing area or escutcheon of the CRT screen during last-line overscan by providing a current surge for a preselected interval sufficient to allow for desired diagnostic sampling and testing, such as cathode current sampling.

24 Claims, 7 Drawing Figures

METHOD AND APPARATUS FOR PERFORMING SCAN LINE DIAGNOSTIC TESTING IN A VIDEO MONITOR DURING A LAST-LINE OVERSCAN OF A NORMAL DISPLAY RASTER

BACKGROUND OF THE INVENTION

The present invention relates generally to improvements in the video display monitor art. More particularly, the present invention seeks to provide circuitry for adjusting various conditions in video display monitors during operation without distortion of the video display.

Color video images are generated in television receivers utilizing picture tubes having red (R), green (G) and blue (B) electron guns. Generally, the electron guns are driven by applying relatively high voltages to their respective cathodes. Due to the frequently high voltages and other effects of relatively heavy use, cathodes and the supporting circuitry are subject to wear over time. When one cathode wears or ages at a different rate than the others, the color tracking of the picture tube, sometimes referred to as color temperature, may be adversely affected. Correspondingly, the color picture quality may be unsatisfactorily degraded. Accordingly, it has been desirable to monitor cathode currents against known standards and provide correction signals to match the cathodes as nearly as possible. This has frequently been done in standard television applications by testing during video blanking intervals. In television applications, this has been generally acceptable because of the fairly long vertical blanking intervals used in standard television signals. Additionally, television receivers have traditionally been overscanned, that is, a percentage of the active raster is off the screen. Thus, sampling of the cathode currents during vertical blanking intervals creates no visual distortion on the screen.

U.S. Pat. Nos. 4,370,674 and 4,342,048 illustrate various circuitry and methods for such CRT stabilization and tracking.

Similar aging effects may occur in color video monitors, and such effects may be more undesirable because of the frequently rigid demands for contrast between text and graphics in such applications. However, monitoring of the cathode currents and the aging effects of the individual cathodes may be more difficult in a color video monitor application, because the CRT is typically underscanned with the entire active raster located within the viewing area of the screen defined by the cabinet bezel opening. Accordingly, traditional techniques may be unacceptable because of potential visible distortion in the display during the cathode current sampling. Also, the active raster typically may not be expanded beyond the bezel opening because of physical constraints associated with the use of color video monitors in computer related applications, e.g., high frequency requirements, limited retrace time, and need for visual video information on all of the active lines of the display field.

Accordingly, it is the primary object of the present invention to generally overcome the deficiencies in the prior art.

It is a further primary object of the present invention to provide a means and method for allowing cathode sampling in a color video monitor while preserving the visual video display.

It is a further object of the present invention to provide a last-line overscan feature in a color video monitor for allowing CRT cathode current sampling while the visual raster trace is off-screen without undue negative impact on the vertical retrace time.

It is still a further object of the present invention to provide for an improved color video monitor in which aging affects may be continually monitored so as to allow for the preservation of the desired color tracking between R, G and B cathodes.

BRIEF DESCRIPTION OF THE FIGURES

The novel features of the present invention are set forth with particularity in the appended claims. The invention, together with the objects and advantages thereof, may be more fully understood by reference to the following detailed description taken in conjunction with the accompanying drawings in which like reference numerals are used to indicate like elements and of which:

DETAILED DESCRIPTION OF THE INVENTION

Figure 1:
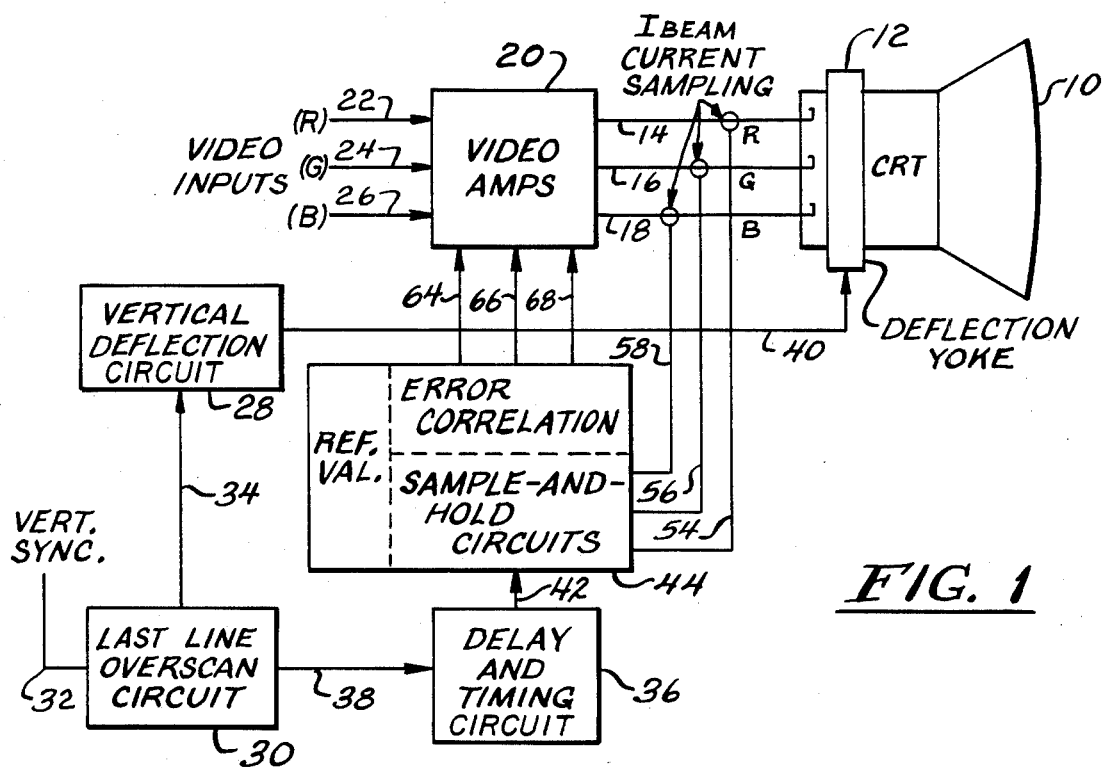
FIG. 1 is a schematic representation of one embodiment of a color video monitor system which may utilize the present invention.

The present invention generally may be utilized in a video monitor system to allow sampling of CRT cathode current even when the CRT display is underscanned, without disrupting the visual display. Upon detection of a vertical sync signal, the vertical amplifier and retrace circuitry of the display monitor is momentarily disconnected from the vertical deflection yoke circuit. During this disconnect time, a current surge is switched through the vertical deflection yoke to vertically displace the visual trace beyond the edge of the bezel, so that cathode current sampling may be done non-visibly. After a short period for sampling, the vertical amplifier and retrace circuitry is reconnected to the vertical yoke deflection circuit, and vertical retrace is allowed to occur. A color video monitor system which may utilize the last line overscan circuit of the present invention is illustrated generally by the schematic of FIG. 1. The timing of the functions for the various circuits of FIG. 1 is illustrated generally by the timing diagrams of FIG. 2 in conjunction with a representation of the current through the vertical deflection yoke. The last-line overscan, i.e., off-screen deflection of the last line of the raster, is illustrated generally in the diagram of FIG. 3 in which the active raster is displayed well within the escutcheon of the video display screen and the last line, which is overscanned, is illustrated off-screen.

Referring now to FIG. 1 therein is shown a CRT tube 10 having a deflection yoke 12. The CRT 10 receives RGB inputs from lines 14, 16 and 18 respectively. RGB outputs on lines 14, 16 and 18 are received from video amps 20 which receive respective RGB inputs on lines 22, 24 and 26. The deflection yoke 12 is controlled by a vertical deflection circuit 28 which normally provides a sawtooth-type current waveform, having a period equal to the duration of each vertical display field, to the deflection yoke 12. The deflection circuit 28 also includes vertical flyback (retrace) circuitry which normally operates in response to a vertical sync signal to cause the CRT raster scan to fly back to the top of the display. In operation of this embodiment of the present invention, last-line overscan circuitry is interposed between the incoming vertical sync signal and the vertical flyback (retrace) and other circuitry of the vertical deflection circuit 28.

FIG. 1 does not illustrate the horizontal deflection circuitry used to effectuate the horizontal scanning of the raster display. Such circuitry is well known in the art and any horizontal deflection system is envisioned to be satisfactory.

The present invention may be implemented in the schematic video monitor system of FIG. 1 by inclusion of a last-line overscan circuit 30 in accordance with the present description. The last-line overscan circuit 30 receives vertical sync information on a line 32, generates a current pulse signal to the vertical deflection circuit 28 via a line 34 and provides a timing signal to a delay and timing circuit 36 via a line 38. The signal from line 34 temporarily disconnects the vertical flyback circuitry in the deflection circuit 28 from the CRT deflection yoke and causes the vertical deflection circuit 28 to generate a negative current pulse on a line 40 which is applied to the deflection yoke 12 to cause the raster scan to jump off the visual screen for cathode current sampling. Once the raster scan has been moved from the visual display area of the monitor, the delay and timing circuit 36 will provide information via a line 42 to sample-and-hold circuits 44. Via lines 54, 56 and 58, sample-and-hold circuits 44 sample the R, G, B cathode currents of CRT 10 present on lines 14, 16 and 18, respectively (shown as "$I_{beam}$ current sampling"). Those skilled in the art will recognize that the entire current loop is not shown in detail in FIG. 1, e.g., cathode, node, high voltage generator and back to amplifier ground. This loop is illustrated generally in FIG. 1 to show the desired current sampling. The sampled currents then may be compared against reference values for error correlation in the sample-and-hold circuits 44 and correction signals may be supplied to the video amps 20 via lines 64, 66 and 68 to appropriately adjust the R, G, B inputs, respectively. In this fashion, variations in the individual R, G and B cathodes of the CRT 10 may be counterbalanced so that the chromaticity of the displayed video information will remain constant throughout the lifetime of the CRT 10.

The signal on the line 34 from the last-line overscan circuit 30 temporarily disconnects the vertical flyback circuitry in the vertical deflection circuit 28. This prevents vertical flyback, which normally occurs in response to the vertical sync signal, from occurring during the last-line overscan interval. Thus, the present system effectively delays vertical flyback so that cathode currents may be sampled during the overscan interval prior to vertical flyback, without visible distortion on the display.

The sample-and-hold circuits 44 illustrated in FIG. 1 are intended to be representative of the known circuitry for accomplishing the sampling, tracking or stabilization of the CRT cathode currents. It is envisioned that these circuits provide the desired reference values and error correlation between sampled values and the reference values. Further, as mentioned above, correction signals are fed back to the video amps as a result of the error correlation. It is envisioned that CRT tracing and stabilization techniques as shown in U.S. Pat. Nos. 4,370,674 and 4,342,048 may be utilized for this application in the present embodiment.

Figure 2:
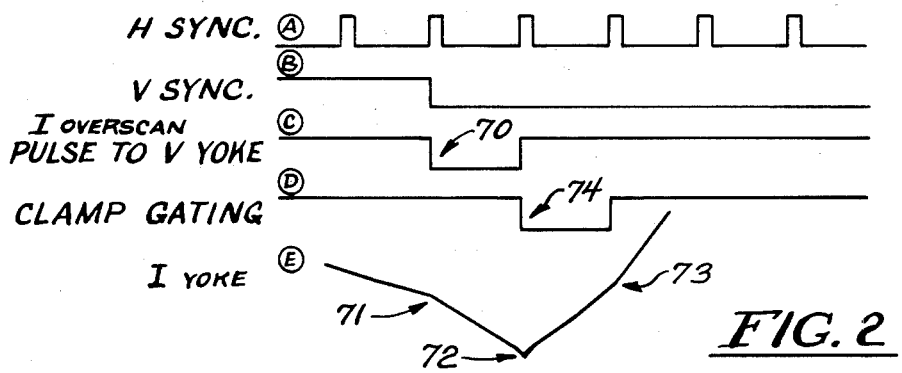
FIG. 2 is a collection of waveforms illustrating the relationship between vertical sync signals and a vertical deflection current signal in a video monitor system made in accordance with the present invention.

Operation of the system of FIG. 1 may be further understood as an application of the present invention by reference to the timing diagrams and waveforms of FIG. 2. More particularly, waveform A of FIG. 2 illustrates the horizontal sync information utilized in the video display system and provides a ready timing measure. When a vertical sync signal such as shown by waveform B of FIG. 2 is received, a current overscan pulse to the vertical deflection yoke is generated as shown by waveform C. Application of the overscan pulse 70 of waveform C to the vertical deflection yoke creates a dimple or negative surge current through the yoke as shown by portion 72 of waveform E of FIG. 2 between inflection points 71 and 73. It will be appreciated that waveform E represents a visual representation of the current through the deflection yoke 12 as a function of time on an exaggerated scale. Normally, the current through the deflection yoke approximates a linear sawtooth wave form having a period equal to the total of the horizontal line intervals utilized in each display field. At the conclusion of the pulse to the vertical yoke, the raster scan will have been relocated from the visual portion of the CRT 10. At this time, it is desirable to gate the sample-and-hold circuits to sample the cathode currents for the R, G and B inputs of CRT 10 to accomplish the desired scan diagnostic testing, e.g., cathode current sampling and comparison. This is accomplished by gating pulse 74 in waveform D of FIG. 2. In this fashion, the visual display of CRT 10 is not distorted during the diagnostic testing. Rather, vertical retrace is simply delayed by approximately two lines while the cathode current sampling is accomplished. Addition of slightly faster retrace circuitry may readily compensate for this slight delay.

It will be appreciated that the waveforms of FIG. 2 are somewhat general in their representation of the operation of systems such as that of FIG. 1. The operation of the last-line overscan circuit in a particular embodiment is discussed in detail below in conjunction with the operation of the circuit of FIG. 5 and the corresponding waveforms of FIGS. 6 and 7.

Figure 3:
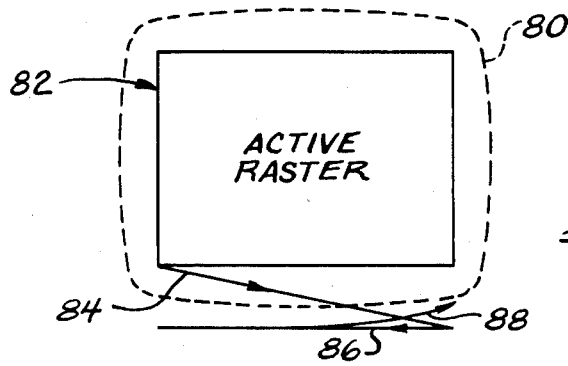
FIG. 3 is a front view of the display area of a color video monitor showing the active raster and the displaced last-line overscan in accordance with the present invention.

A visual representation of the movement of the raster scanning trace from the visual portion of the CRT is illustrated in FIG. 3. Therein, the escutcheon of the CRT video display is illustrated by broken line 80. The active raster is outlined as a portion 82. The negative current surge through the deflection yoke 12 causes the raster scan to be noticeably vertically offset during the horizontal scan period of a scan line 84. At the conclusion of the horizontal line 84 and subsequent to horizontal retrace as shown by a scan line 86, diagnostic testing of the cathode currents may occur during the horizontal line shown by a scan line 88. During horizontal line trace 88, the negative current surge through the deflection yoke 12 has subsided and vertical positioning has begun to drift back towards the visual area within the limits of the escutcheon 80. At the conclusion of horizontal trace 88, vertical retrace occurs and the active raster is again defined beginning with the upper left-hand corner of the active raster outline 82.

Figure 4:
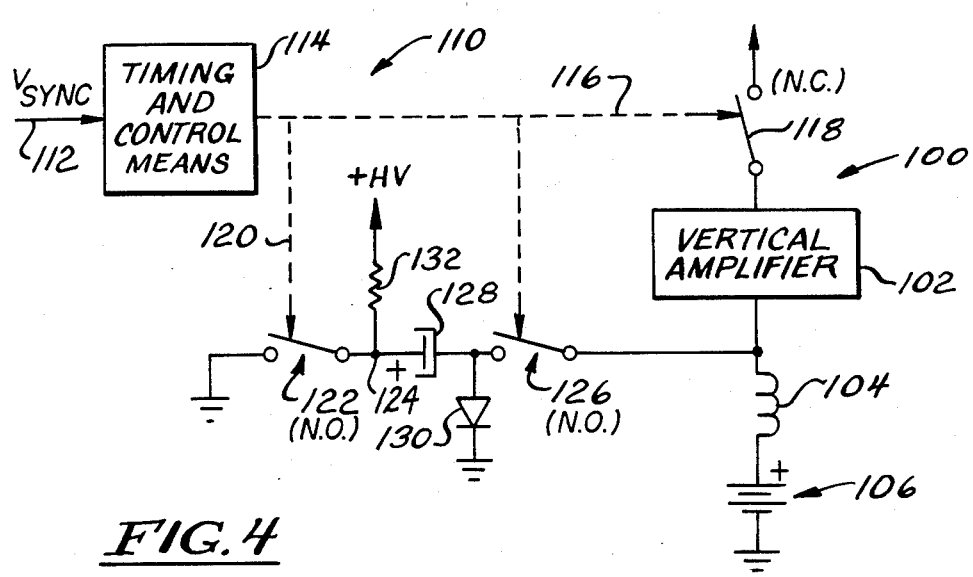
FIG. 4 is a schematic representation of one embodiment of the present invention for providing last-line overscan for testing of CRT characteristics prior to vertical retrace.

Referring now to FIG. 4, therein is shown a schematic representation of a CRT vertical scanning stage 100 comprising a vertical amplifier 102, a vertical deflection yoke 104 and an energy storage device 106. In typical operation, the vertical amplifier 102 charges a current through the vertical deflection yoke 104 in a gradually decreasing manner to gradually decrease the vertical deflection of the active raster from top to bottom during raster scan. During this time, energy is built up in the energy storage device 106 to facilitate vertical retrace. When a vertical sync signal is received, the vertical amplifier 102 in conjunction with the storage device 106 causes a reverse surge of current through the deflection yoke 104 to effectuate vertical retrace.

The means and method of the present invention may be implemented in conjunction with the vertical scanning stage 100 by addition of a last-line overscan circuit 110, as generally illustrated in FIG. 4. A vertical sync signal is received on a line 112 by a timing and control means 114. Upon detection of a vertical sync pulse on the line 112, the timing and control means 114 provides an indication on a line 116 to cause a normally-closed switch 118 to open. This disables the vertical amplifier 102 to effectively remove it from the vertical scanning stage 100 for an interval of time determined by the timing and control means 114. Corresponding to the indication on the line 116, an indication is provided on a line 120 to a normally-open switch 122 to cause the switch 122 to close, thereby effectively grounding a node 124. Correspondingly, a normally-open switch 126 is also caused to close to provide an electrical path to the vertical deflection yoke 104.

When the switch 122 is closed to ground the node 124, an energy storage device illustrated as a electrolytic capacitor 128 will discharge its stored energy. Because of a diode 130, the only path of discharge for the capacitor 128 is through the now-closed switch 126 and the vertical deflection yoke 104. This effectuates an energy surge through the vertical deflection yoke 104 in response to detection of a vertical sync signal by the overscan circuit 110. The magnitude of this negative current surge corresponds to the magnitude of the potential stored at the capacitor 128 prior to detection of the vertical sync signal.

More particularly, prior to detection of a vertical sync signal, both switches 122 and 126 are open. This provides a path from a positive high voltage (HV) through a resistor 132, a capacitor 128 and a diode 130 to charge the capacitor 128. When switch 122 is closed in response to the detection of a vertical sync signal, the capacitor 128 is changed from a charging state to a discharging state. When a switch 126 is then closed, it effectively couples the vertical deflection yoke 104 to the capacitor 128 to provide the discharge path.

At the end of an interval determined by the timing and control circuit 114, which may be selected by determining particular circuit parameters, the switching signals on the lines 116 and 120 are terminated. Termination of the signal on the line 116 allows the normally-closed switch 118 to again close and reconnect the vertical amplifier 102 to the vertical deflection yoke 104. Because a vertical sync pulse is still present, other circuitry not illustrated in FIG. 4 and not crucial to the present invention triggers the vertical amplifier to begin vertical retrace. Also, termination of the signal on the line 120 allows the normally-open switch 122 to again open and return the capacitor 128 to a charging state. Likewise, the normally-open switch 126 again opens which effectively decouples the capacitor 128 from the vertical deflection yoke 104. In this fashion, capacitor 128 can again charge to a value, approximately 'HV, until the leading edge of another vertical sync signal is detected.

Figure 5:
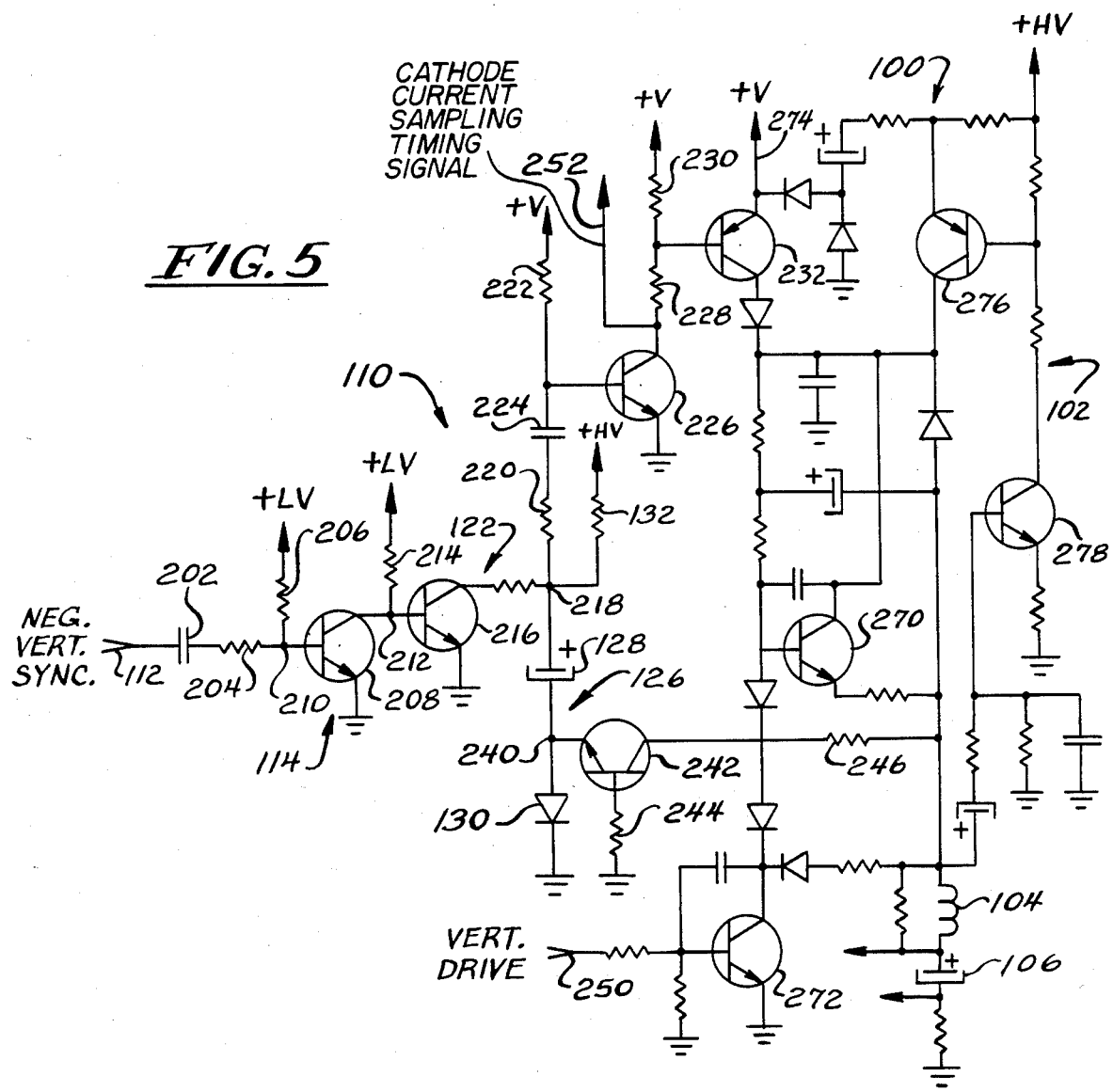
FIG. 5 is an electrical schematic diagram illustrating a preferred embodiment of circuitry for providing last-line overscan for CRT characteristic monitoring during vertical retrace time and in conjunction with existing circuitry for vertical deflection and retrace.

Referring now to FIG. 5, therein is shown a detailed electrical schematic of the vertical scanning stage 100 in conjunction with the last-line overscan circuitry 110. Corresponding to the general schematic of FIG. 4, the vertical deflection yoke 104 is controlled by the vertical amplifying means 102 in conjunction with the energy storage capacitor 106. The timing and control means 114 receives a negative vertical sync signal on the line 112 and controls the normally-open switch 122 and, ultimately, the normally-open switch 126. The control means 114 also provides an indication to the normally-closed switch 118 to remove the amplifier means 102 from the vertical scanning stage upon detection of a vertical sync pulse until completion of the diagnostic testing.

More specifically, the timing and control means 114 comprises a first capacitor 202, resistors 204 and 206 and a NPN transistor 208. The leading edge of a negative vertical sync pulse on the line 112 creates a negative pulse at a node 210 at the base of a transistor 208 which turns off the transistor 208 for a time interval determined by the RC time constant of the control means 114. In the circuit of FIG. 5, this is a function of the values of the resistors 206 and 204 and the capacitor 202.

When the transistor 208 turns off, a node 212 of the switching means 122 will go high through the action of a positive voltage (LV) and a resistor 214. This turns on a transistor 216, which effectively grounds a node 218 which has previously been at a relatively high voltage (HV) through the charging action of the capacitor 128 through the resistor 132 and the diode 130 from the high voltage source (HV). Through the action of resistors 220 and 222 with a capacitor 224, the base voltage at an NPN transistor 226 goes low, which effectively shuts off the transistor 226 for a period equal to the time during which the node 218 is low, plus an interval approximately equal to a time constant determined by the values of the resistors 220 and 222 and the capacitor 224. Turning off the transistor 226 removes the voltage divider network between resistors 228 and 230 which allows the voltage at the base of a PNP transistor 232 to rise and turn off the transistor 232. Turning off the transistor 232 removes the positive voltage source (+V) necessary for the vertical amplifier circuitry 102 to initiate vertical retrace, thus delaying vertical retrace until the last-line overscan period of the present invention is complete.

As mentioned previously, the node 218 goes low in response to the detection of a negative vertical sync pulse on the line 112. When the node 218 goes low, the capacitor 128 changes from its previously charging state to a discharging state, and an effective negative voltage is imposed on a node 240. A negative voltage on the node 240 will close the normally-open switching means 126 which comprises a PNP transistor 242 and a grounded base resistor 244. This provides a coupling path from the deflection yoke 104 through a resistor 246 and the transistor 242 to discharge the energy stored in the capacitor 128. In this fashion, a high potential may be rapidly impressed across the vertical deflection yoke 104 upon detection of a negative vertical sync pulse. Cooperation between the capacitor 128 and another capacitor 106 creates this high potential which impresses a current surge through yoke the 104 to drive the vertical trace beyond the normal viewing area of the screen as illustrated in FIG. 3.

As mentioned above, the negative vertical sync received on the line 112 initially drives the node 210 at the base of the transistor 208 low to effectively turn it off. The negative voltage at the node 210 decays according to the time constant determined by the resistors 204 and 206 and the capacitor 202. At the end of this time constant, selected in the preferred embodiment to be approximately equal to the duration of one horizontal scan line, the transistor 208 again turns on, thereby turning off other transistors 216 and 242. This decouples the energy storage capacitor 128 from the vertical deflection yoke 104 and begins recharging the storage capacitor 128 through the path of the resistor 132 and the diode 130. Also, as the voltage on the node 218 again rises, the voltage at the base of the transistor 226 will correspondingly rise in accordance with the time constant determined by the resistors 220 and 222 and the capacitor 224. In the preferred embodiment of the present invention, this time constant is again selected to be approximately equivalent to the duration of one horizontal scan line. It is during this last-line overscan interval that cathode currents may be sampled as part of the diagnostic testing as shown by the horizontal trace 88 illustrated below the escutcheon level in FIG. 3. At the conclusion of this interval, the transistor 232 again turns on to reactivate positive voltage supply (+V) to the vertical amplifier means 102, which in response to the still-present vertical drive signal on a line 250 will initiate vertical retrace. In this circuit, the signal on a line 252 at the collector of the transistor 226 may be used as a timing signal for sampling the cathode currents.

The remaining elements not described above but shown in FIG. 5 generally comprise the vertical amplifier circuit 102 which operates in a well-known fashion in response to the receipt of a vertical drive pulse on the line 250. The elements described above interface with the vertical amplifier 102 through the resistor 246 and transistors 242 and 232 to generally delay the vertical retrace of the raster scan. In the preferred embodiment, the total delay is approximately equal to two horizontal lines.

More specifically, the vertical amplifier 102 operates in a generally linear fashion with transistors 270 and 272 operating linearly to gradually decrease the current through the vertical deflection yoke 104 during each video display frame. This action is generally shown by waveform E of FIG. 2 at the portion 71 prior to the identified portion 72. Upon detection of a vertical drive (negative vertical sync) signal on the line 250, if the vertical amplifier 102 is supplied with positive voltage at a line 274, the transistors 276 and 278 effectuate the vertical retrace and drive the current through the vertical deflection yoke to its original value as shown generally by the portion 73 of waveform E in FIG. 2.

Figure 6:
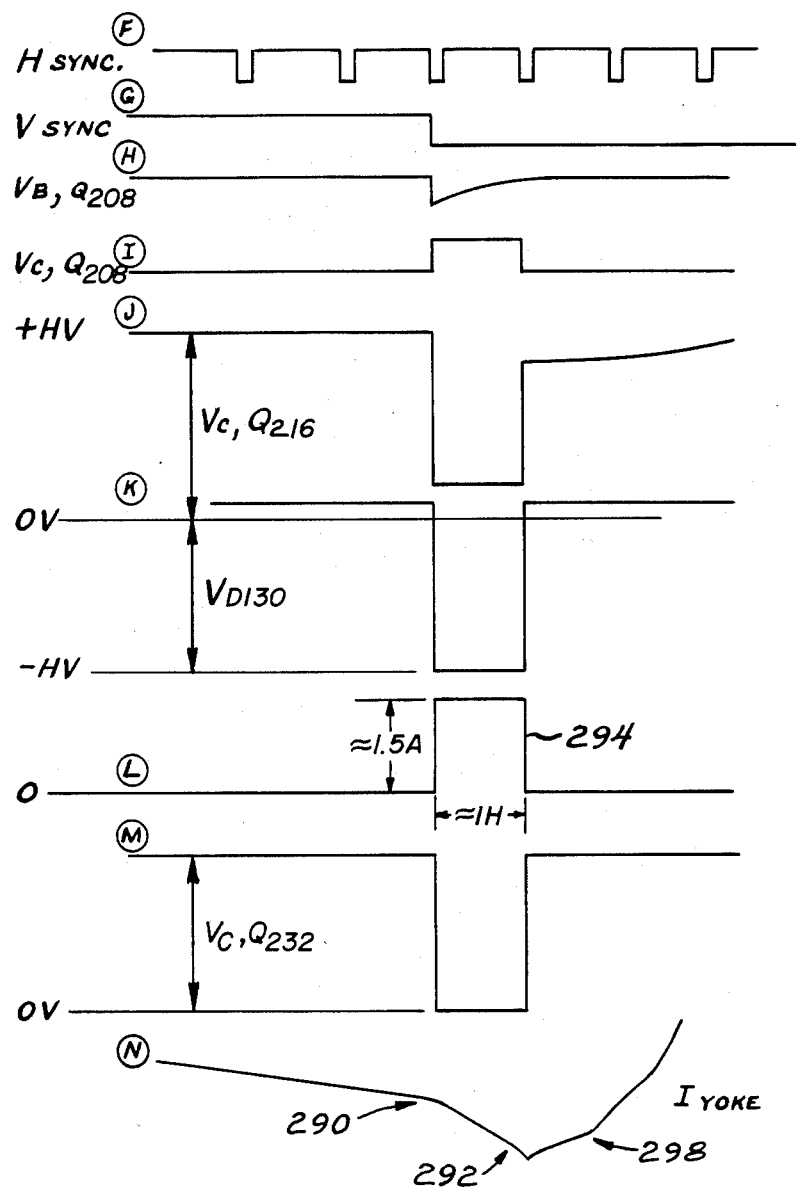
FIG. 6 is a collection of waveforms illustrating various signals present in the embodiment of FIG. 5.
Figure 7:
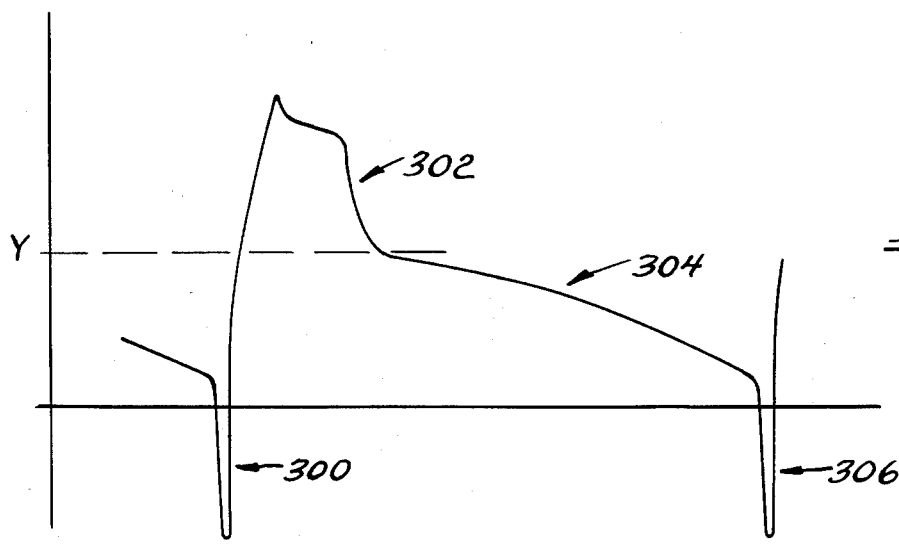
FIG. 7 is an enlarged representation of the current waveform through the vertical deflection yoke for one embodiment of a color video monitor made in accordance with the present invention.

Referring now to FIG. 6, therein is shown a collection of waveforms illustrative of the signals present at various points in the circuit of FIG. 5 during its operation. Initially, waveform F again comprises a general timing signal corresponding to the horizontal line intervals of the horizontal sync signal.

Waveform G of FIG. 6 represents the negative vertical sync timing signal much as it would be received on the line 112 and the line 250. In response to this waveform G on the line 112, the base voltage at the node 210 at the base of the transistor 208 would be approximated by waveform H. Relatedly, waveform I represents the voltage at the collector of the transistor 208 at a node 212. This voltage is high for approximately one horizontal line as illustrated and corresponds to the RC time constant illustrated by the decay of waveform H.

Relatedly, waveform J represents the output voltage at the collector of another transistor 216 which approximates that at the node 218. When the other transistor 216 is turned on in response to waveform I, the voltage at its collector drops to approximately zero volts. It remains at this value until such time as the transistor 208 is turned off and its output voltage shown by waveform I drops low, thereby turning off the other transistor 216 and allowing the voltage at its collector to gradually return to a previous high value, approximately +HV. In a similar fashion, the voltage across the diode 130 as illustrated by waveform K is at a small positive value during the charging state of the capacitor 128. When the node 218 goes low, corresponding to when waveform J goes low, a large negative value, approximately equal to −HV, is impressed across the diode 130, as shown in waveform K. This results in the current pulse 294 shown by waveform L, which flows through the circuit generally comprised of the vertical deflection yoke 104 and the transistors 242 and 216. In the preferred embodiment of the present invention, this current pulse has a peak value of approximately 1.5 amps and a duration of about one horizontal line interval.

Additionally, as illustrated by waveform M of FIG. 6, the voltage at the collector of the transistor 232 operates as a voltage source for the vertical amplifier means 102. As seen in FIG. 6, waveform M drops to zero volts when the transistor 232 is turned off in response to the detection of a vertical sync signal as received on the line 112. Power returns to the vertical amplifier means 102 at the collector of the transistor 232 after approximately one horizontal line interval has elapsed. At this point vertical retrace may be initiated.

Waveform N of FIG. 6 further illustrates the current passing through the vertical deflection yoke 104 as a function of time. Again, it will be appreciated by those familiar with raster-scan-type display that the current through the vertical deflection yoke approximates a sawtooth waveform over a period equal to the vertical field duration, and that waveform N is a slightly exaggerated representation of a selected portion of the current waveform. As shown generally in FIG. 2 above, current gradually decreases through a region 290 while the raster scan trace progresses down the active raster. At a portion 292 corresponding to the current pulse 294 of waveform L, the current through the deflection yoke surges rapidly negative to drive the trace beyond the bezel and off the visual display area. Subsequently, at a portion 298, the current through the yoke is again increased to effectuate the vertical retrace so that the raster scan may be reinitiated at the upper left-hand corner of the visual display Referring now to FIG. 7, therein is shown an expanded view of the current through the vertical deflection yoke. As mentioned previously, a portion 300 serves to effectively drive the trace off the visual area of the CRT to allow for diagnostic current sampling at the CRT. Subsequent to the portion 300 and the desired cathode current sampling, the current through the deflection yoke is rapidly increased at a waveform portion 302 during vertical retrace to return the deflection current to about a value Y corresponding to vertical displacement of the top horizontal line of the active raster. The deflection current then decays at a waveform portion 304 as the trace moves gradually down the raster scan toward the bottom. Once the active raster has been scanned, a portion 306 representing a negative current spike again drives the trace off the visual display area resampling of the currents of the CRT. In this fashion, scan diagnostic testing may be done for each RGB cathode once per frame so as to constantly monitor cathode currents and preserve the desired display chromaticity. Because the diagnostic testing is done while the trace is off-screen and prior to vertical retrace, the integrity of both the retrace and the visual display is preserved As set forth above, the circuitry and method of the present invention may require slightly faster vertical retrace capability because of the approximate two horizontal line delay created in the illustrated embodiments. However, this will not effect the implementation of the present invention as such circuitry will necessarily be dependent upon the particular vertical scanning circuitry utilized in any application and any other modification is considered to be within the degree of skill in the video art.

Although described above in terms of a number of preferred embodiments, the present invention is set forth with particularity in the appended claims. It is envisioned that the spirit of the present invention encompasses all other embodiments, alterations or modifications which would be apparent to one of ordinary skill in the art and familiar with the teachings of the present application.

What is claimed is:

1. In a video monitor system having raster-type display means responsive to deflection means to produce a normal display raster, said system including vertical deflection means having vertical retrace circuitry for controlling said raster-type display means, video amplifier drive means for driving said display means and means for sampling cathode currents of said display means and providing correction signals to said video amplifier drive means means for facilitating monitoring said cathode currents comprising:

last-line overscan means responsive to vertical sync signals to generate an overscan signal; and
means for transmitting said overscan signal to said vertical deflection means to inhibit said vertical retrace circuitry for a selected period and to cause said vertical deflection means to provide at least one horizontal trace outside the normal display raster during said selected period.

2. The circuitry of claim 1 further including timing means coupled to said overscan means and said sampling means and responsive to said overscan signal for enabling said means for sampling cathode curents to sample during said selected perod.

3. In a video monitor system having vertical deflection means and vertical trace control means for controlling vertical movement of a trace in a normal display raster, circuitry for providing last-line overscan comprising:

first means adapted to receive and detect a vertical sync signal;
second means coupled to said first means and responsive thereto to disable said vertical trace control means upon detection of said vertical sync signal; and
third means coupled to said first means and responsive to said detection to cause said vertical deflection means to move said trace to a location removed from said normal display raster.

4. The circuitry of claim 3 wherein said third means further comprises:

energy storage means;
first switching means coupled to said energy storage means and to said first means to discharge energy stored in said energy storage means; and
second switching means coupled to said energy storage means and to said vertical deflection means to provide said discharged energy to said vertical deflection means to move said trace to a location removed from said normal display raster.

5. The circuitry of claim 4 further comprising energy charging means coupled to said energy storage means to charge said energy storage means with energy prior to said discharge.

6. The circuitry of claim 4 wherein said energy storage means is an eloctrolytic capacitor.

7. The circuitry of claim 4 wherein said first and second switching means comprise first and second transistors, respectively.

8. The circuitry of claim 7 wherein said second means comprises transistor means responsive to activation of said first transistor to disable said vertical trace control means during said energy discharge.

9. The circuitry of claim 3 wherein said first means comprises control switch means adapted to receive and detect said vertical sync signal and generate an output signal upon detection of said vertical sync signal.

10. The circuitry of claim 9 wherein said first means further comprises timing means coupled to said control switch means to terminate said output signal at a selected time subsequent to said detection of said vertical sync signal.

11. The circuitry of claim 10 wherein said control switch means comprises a third transistor.

12. In a video monitor system having raster-type RGB display means responsive to RGB drive means and controlled by vertical deflection means for controlling the vertical location of a trace in a raster scan display and vertical trace control means for providing vertical retrace of said raster scan display in response to a vertical sync signal, a method for allowing scan diagnostic testing while preserving vertical retrace integrity comprising:

sensing said vertical sync signal;
inhibiting said vertical retrace in response to said sensing;
initiating a current surge through said vertical deflection means to offset said trace from said raster scan display in response to said sensing, and
terminating said current surge and removing said inhibit after a preselected interval after said sensing.

13. The method of claim 12 further including performing said scan diagnostic testing during said preselected interval.

14. The method of claim 12 wherein said scan diagnostic testing comprises sampling cathode currents of said RGB display means during said preselected interval; said method further including:
adjusting said RGB drive means to compensate for variations in said sampled cathode currents.

15. The method of claim 14 wherein said preselected interval is of a duration equal to about one horizontal line trace period.

16. The method of claim 12 wherein said step of initiating a current surge comprises initiating discharge of charge from a charge storage device and coupling said discharged charge to said vertical deflection means in response to said sensing.

17. The method of claim 16 wherein said preselected interval is determined by an RC time constant of a circuit utilized for sensing said vertical sync signal.

18. In a video monitor system having vertical deflection means for vertical positioning of a raster scan trace and vertical trace control means for controlling vertical scan and vertical retrace of said raster scan trace in a normal display raster, circuitry for allowing scan diagnostic testing while preserving vertical retrace and visual display integrity comprising:
detection means for detecting the receipt of a vertical sync pulse and providing an output indication in response to said receipt;
switching means coupled to receive said output indication and responsive to said output indication to disable said vertical trace control means;
energy storage means;
means for switching said energy storage means from a charging state to a discharging state in response to said output indication; and
means for coupling said energy storage means to said vertical deflection means while said energy storage means is in said discharge state to provide energy being discharged from said energy storage means to said vertical deflection means to vertically deflect said raster scan trace outside said normal display raster for allowing said scan diagnostic testing.

19. The circuitry of claim 18 further including:
means coupled to said detection means for effectively terminating said output indication after a preselected interval.

20. The circuitry of claim 19 wherein said switching means is responsive to said output indication termination to reenable said vertical trace control means.

21. The circuitry of claim 20 wherein said means for switching is responsive to said output indication termination to switch said energy storage means from said discharging state to said charging state.

22. The circuitry of claim 21 wherein said means for coupling is responsive to said switch from said discharging state to said charging state to decouple said energy storage means from said vertical deflection means.

23. The circuitry of claim 19 wherein said interval is determined by an RC times constant of said means coupled to said detection means.

24. The circuitry of claim 19 wherein said interval is about one horizontal line interval.

* * * * *